(12) United States Patent  (10) Patent No.: US 8,732,434 B2
Hwang et al.  (45) Date of Patent: May 20, 2014

(54) MEMORY DEVICE, COMPUTER SYSTEM INCLUDING THE SAME, AND OPERATING METHODS THEREOF

(75) Inventors: Joo Young Hwang, Suwon-si (KR); Hak Soo Yu, Seongnam-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 226 days.

(21) Appl. No.: 13/437,418

(22) Filed: Apr. 2, 2012

(65) Prior Publication Data
US 2012/0260060 A1  Oct. 11, 2012

(30) Foreign Application Priority Data

Apr. 5, 2011 (KR) .......................... 10-2011-0031361

(51) Int. Cl.
*G06F 12/02* (2006.01)
*G06F 17/30* (2006.01)
(52) U.S. Cl.
CPC ................................ *G06F 17/30156* (2013.01)
USPC .......................................................... 711/216

(58) Field of Classification Search
CPC ................................................ G06F 17/30156
See application file for complete search history.

(56) References Cited

U.S. PATENT DOCUMENTS

| 6,789,156 | B1 | 9/2004 | Waldspurger |
| 6,889,297 | B2 | 5/2005 | Krapp et al. |
| 8,261,267 | B2 * | 9/2012 | Iwamatsu et al. ................. 718/1 |
| 8,463,981 | B2 * | 6/2013 | Mori et al. ......................... 711/6 |
| 2009/0063795 | A1 | 3/2009 | Yueh |
| 2009/0287901 | A1 | 11/2009 | Abali et al. |

* cited by examiner

*Primary Examiner* — Hiep Nguyen
(74) *Attorney, Agent, or Firm* — F. Chau & Associates, LLC

(57) ABSTRACT

A memory device includes a hash table storing a hash value, a bit value, and a page address for each of a plurality of pages, a memory cell unit configured to store the pages and output contents corresponding to the page addresses of the pages having a same hash value, and a controller including a comparator configured to compare the contents output from the memory cell unit and change at least one bit value associated with a respective one of the pages upon determining that the contents of the pages are the same.

20 Claims, 9 Drawing Sheets

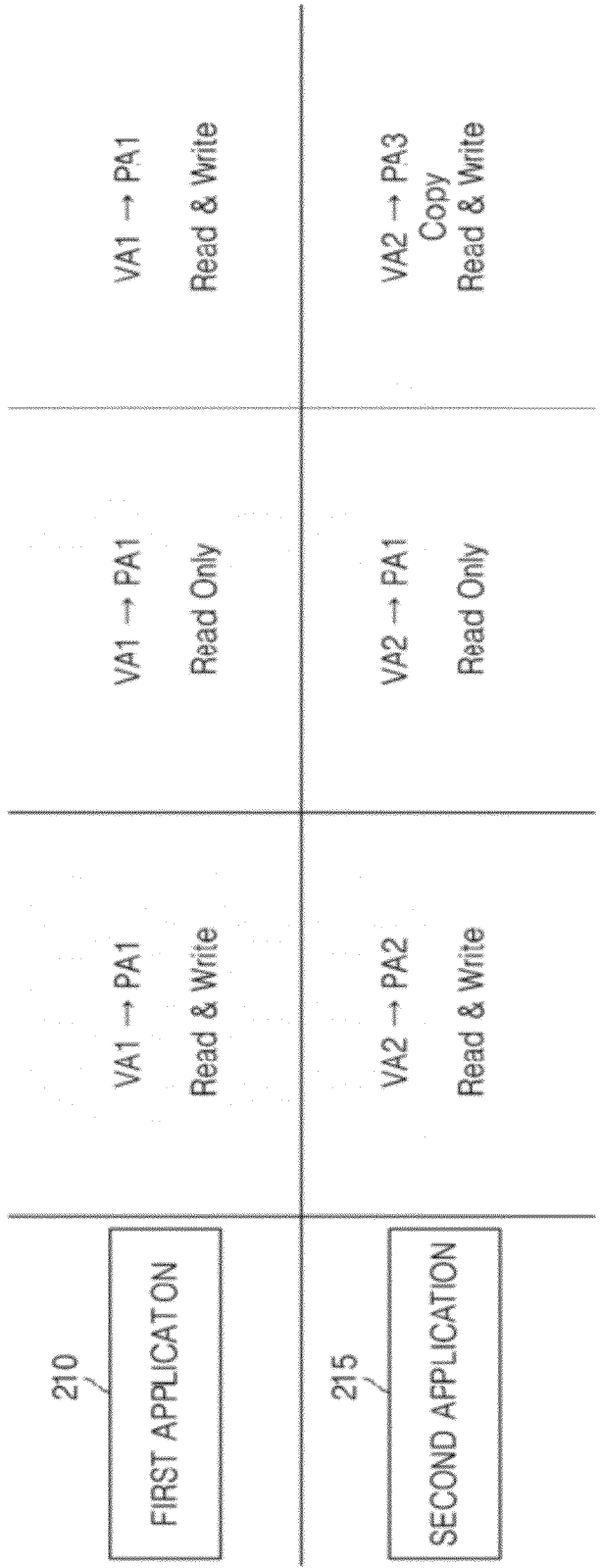

| TABLE INDEX(i) | HASH VALUE (BUCKET INDEX) | BIT VALUE(i) | PAGE ADDRESS |
|---|---|---|---|
| 0 | A | 00 | 0 |
| 1 | A | 01 | 5 |
| 2 | A | 10 | 12 |
| 3 | A | 11 | 9 |
| 4 | B | 00 | 100 |
| 5 | B | 01 | 2222 |
| 6 | O | 10 | |
| 7 | O | 11 | |
| 8 | C | 00 | 22233 |
| 9 | | | |
| 10 | | | |
| 11 | | | | page 0 = page 5
page 12 = page 9

| TABLE INDEX(i) | HASH VALUE (BUCKET INDEX) | BIT VALUE(i) | PAGE ADDRESS |
|---|---|---|---|
| 0 | A | 00 | 0 |
| 1 | A | 00 | 5 |
| 2 | A | 10 | 12 |
| 3 | A | 10 | 9 |
| 4 | B | 00 | 100 |
| 5 | B | 01 | 2222 |
| 6 | O | 10 | |
| 7 | O | 11 | |
| 8 | C | 00 | 22233 |
| 9 | | | |
| 10 | | | |
| 11 | | | |

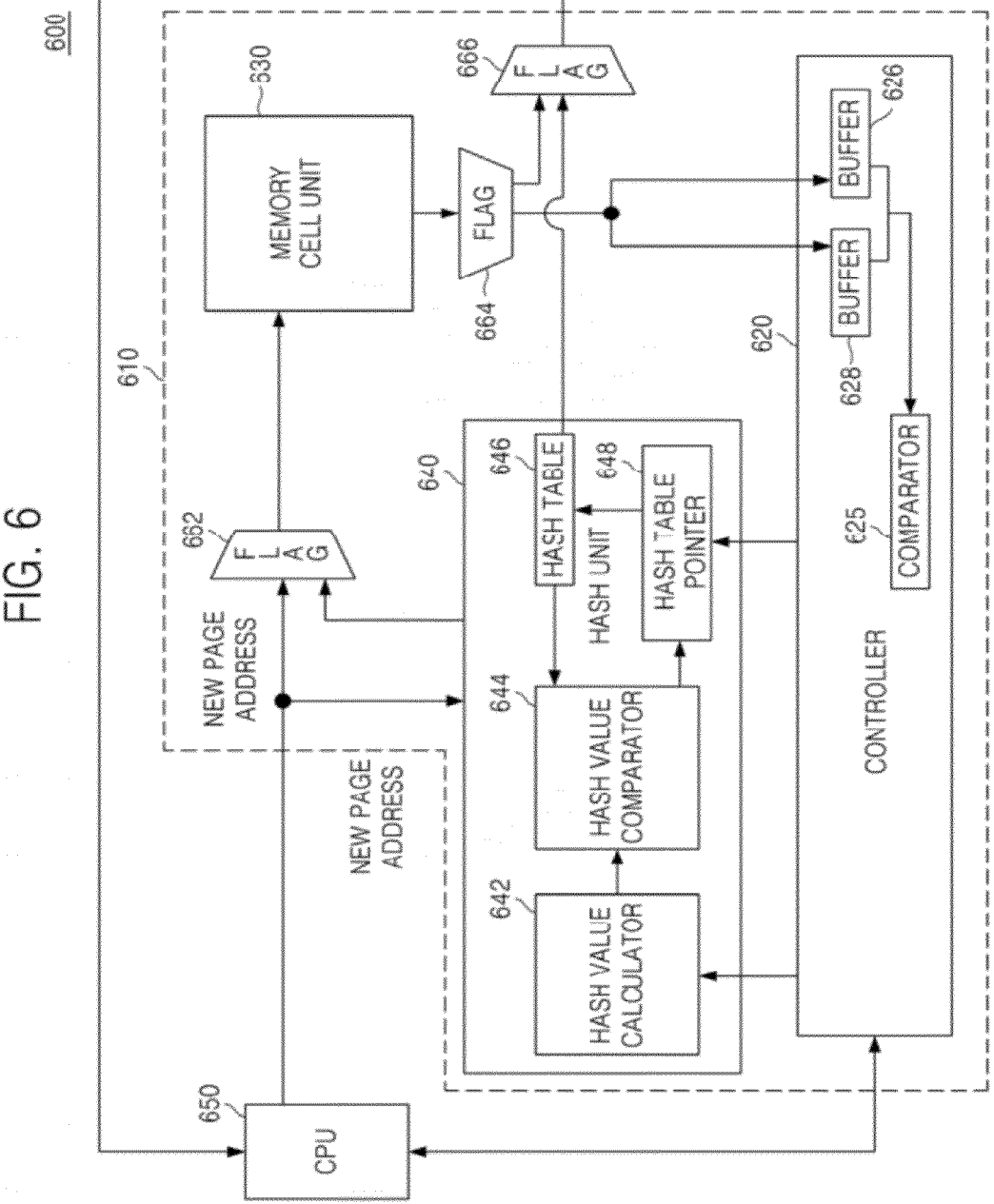

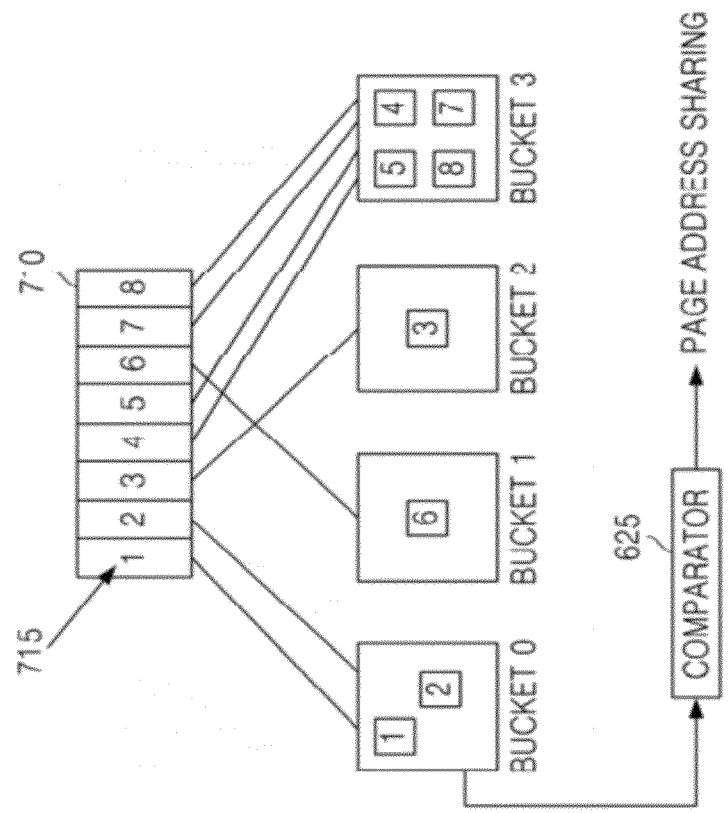

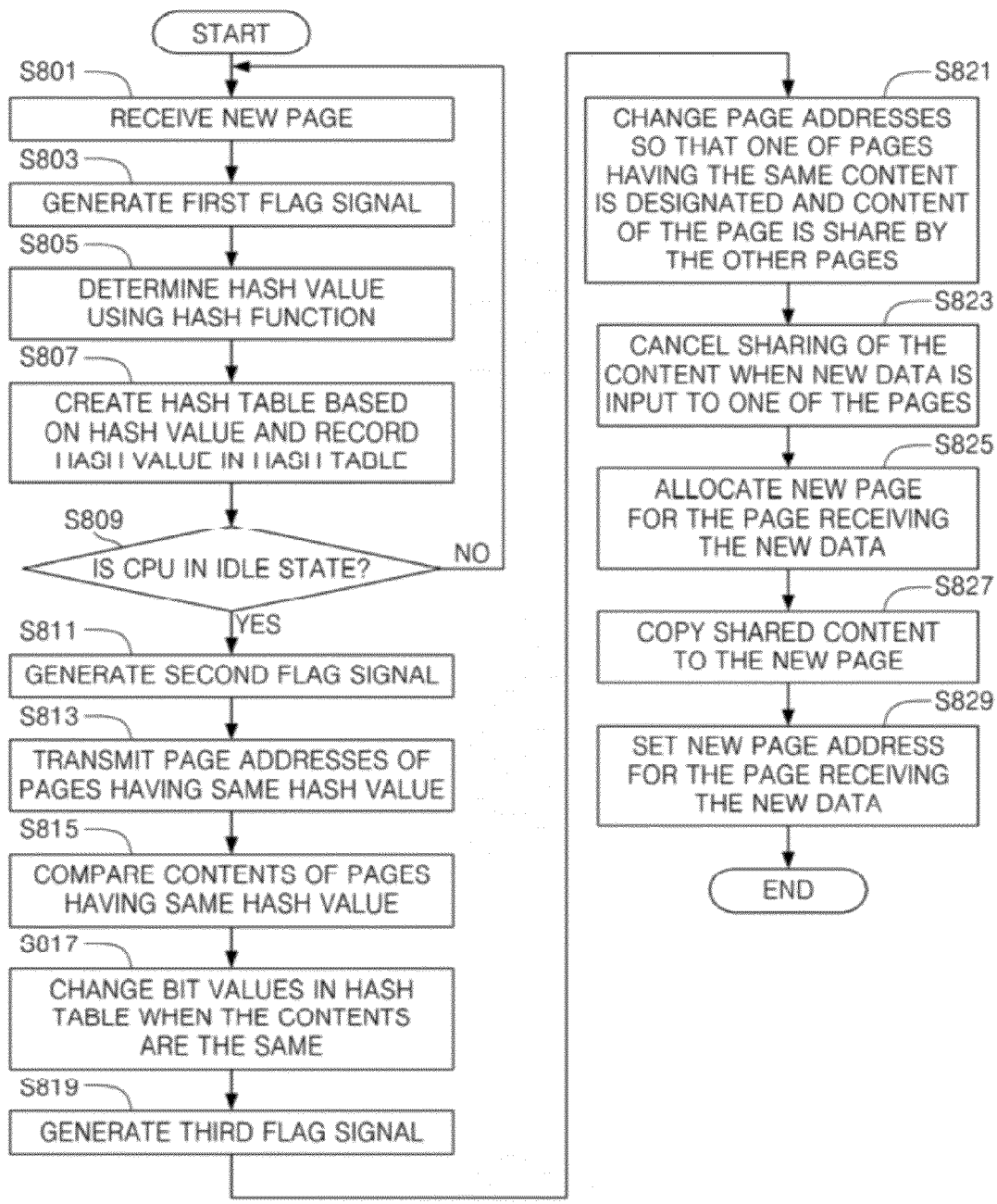

MEMORY DEVICE, COMPUTER SYSTEM INCLUDING THE SAME, AND OPERATING METHODS THEREOF

CROSS-REFERENCE TO RELATED APPLICATIONS

This application claims priority under 35 U.S.C. §119(a) to Korean Patent Application No. 10-2011-0031361 filed on Apr. 5, 2011, the disclosure of which is herein incorporated by reference in its entirety.

BACKGROUND

1. Technical Field

The present disclosure relates to a memory device for allowing memory deduplication therein, a computer system including the same, and operating methods thereof.

2. Description of Related Art

Computer server machines may use virtualization technology to achieve fault tolerance and load balancing. Personal computers also use virtualization technology to run heterogeneous operating systems (OSs). In virtual environments, virtual machines use memory to run an OS. In these environments, both memory and central processing unit (CPU) cycles may be limiting. In a case where two or more OSs have pages with the same content, memory, data deduplication may be used to alleviate these limitations.

However, data deduplication is typically carried out by a CPU as an auxiliary task, which may not disrupt other tasks of the CPU. As a result, the data deduplication process may be slow.

SUMMARY

According to an exemplary embodiment of the present invention, a memory device includes a hash table storing a hash value, a bit value, and a page address for each of a plurality of pages, a memory cell unit configured to store the pages and output contents corresponding to the page addresses of the pages having a same hash value, and a controller including a comparator configured to compare the contents output from the memory cell unit and change at least one bit value associated with a respective one of the pages upon determining that the contents of the pages are the same.

According to an exemplary embodiment of the present invention, a computer system includes a memory device including a hash table storing a hash value, a bit value, and a page address for each of a plurality of pages, a memory cell unit configured to store the pages and output contents corresponding to the page addresses of the pages having a same hash value, and a controller including a comparator configured to compare the contents output from the memory cell unit and change at least one bit value associated with a respective one of the pages upon determining that the contents of the pages are the same. The computer system including a central processing unit configured to transmit a virtual address, and a memory management unit (MMU) configured to translate the virtual address received from the central processing unit into a page address.

According to an exemplary embodiment of the present invention, a method of a memory device includes creating a hash table storing a hash value, a bit value, and a page address for each of a plurality of pages, determining a plurality of page addresses of the pages having a same hash value, comparing a content of each of the pages corresponding to the page addresses with one another to determine at least two pages having a same content, and identifying the at least two pages having the same content with the bit values.

According to an exemplary embodiment of the present invention, a data deduplication method of a memory device includes creating a hash table storing a hash value, a bit value, and a page address for each of a plurality of pages, determining that a central processing unit connected to the memory device is idle, and comparing, during an idle time of the central processing unit, a content of each of the pages having a same hash value with one another to determine at least two pages having a same content.

BRIEF DESCRIPTION OF THE DRAWINGS

Exemplary embodiments of the present invention will become more apparent with reference to the attached drawings in which:

FIG. 4 is a table showing operations performed in a memory device over time according to an exemplary embodiment of the present invention;

FIG. 6 is a block diagram of a computer system according to an exemplary embodiment of the present invention;

FIG. 7 is a diagram showing the relation between a hash table and a page according to an exemplary embodiment of the present invention; and FIG. 8 is a flowchart of an operating method of a computer system according to an exemplary embodiment of the present invention.

DETAILED DESCRIPTION OF EXEMPLARY EMBODIMENTS

Figure 1:
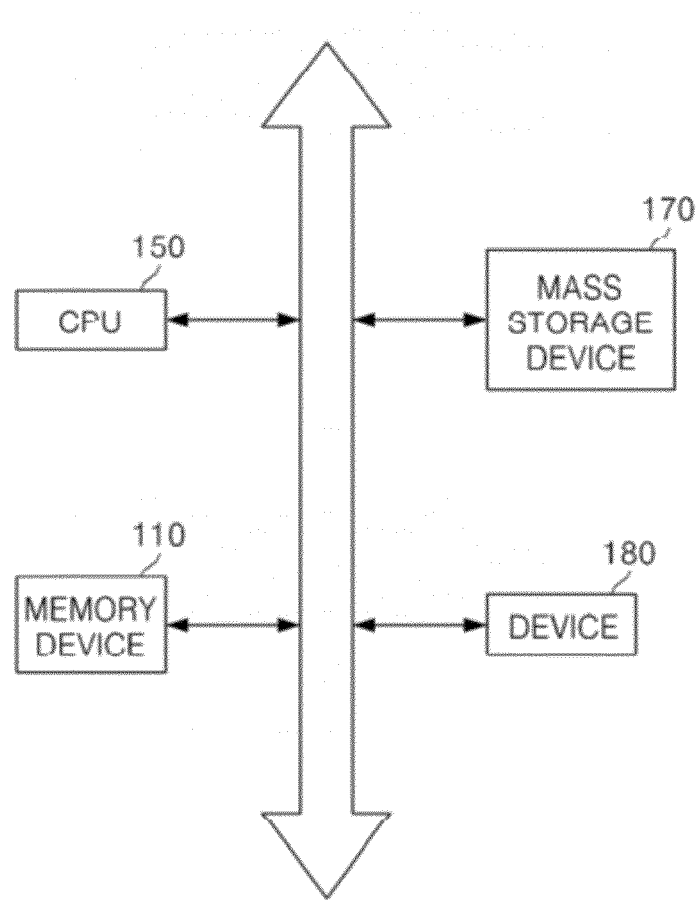
FIG. 1 is a schematic block diagram showing elements of a computer system according to an exemplary embodiment of the present invention.

Exemplary embodiments of the present invention now will be described more fully hereinafter with reference to the accompanying drawings. Embodiments described herein may take many different forms and should not be construed as limited to those set forth herein. Rather, exemplary embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc., may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that teems, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a schematic block diagram showing elements of a computer system 100 according to an exemplary embodiment of the present invention.

Figure 2:
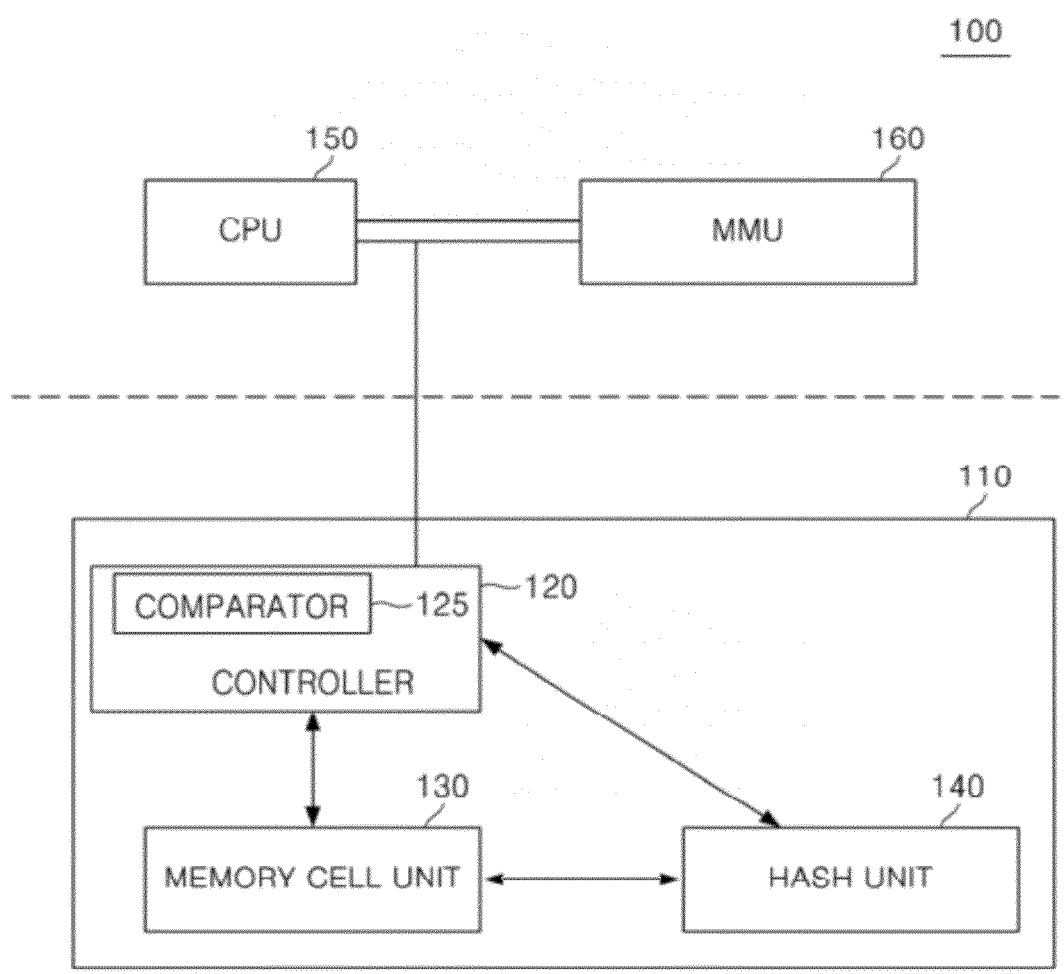
FIG. 2 is a block diagram of part of the computer system illustrated in FIG. 1 according to an exemplary embodiment of the present invention.

FIG. 2 is a block diagram of part of the computer system 100 illustrated in FIG. 1 according to an exemplary embodiment of the present invention.

Figure 3:
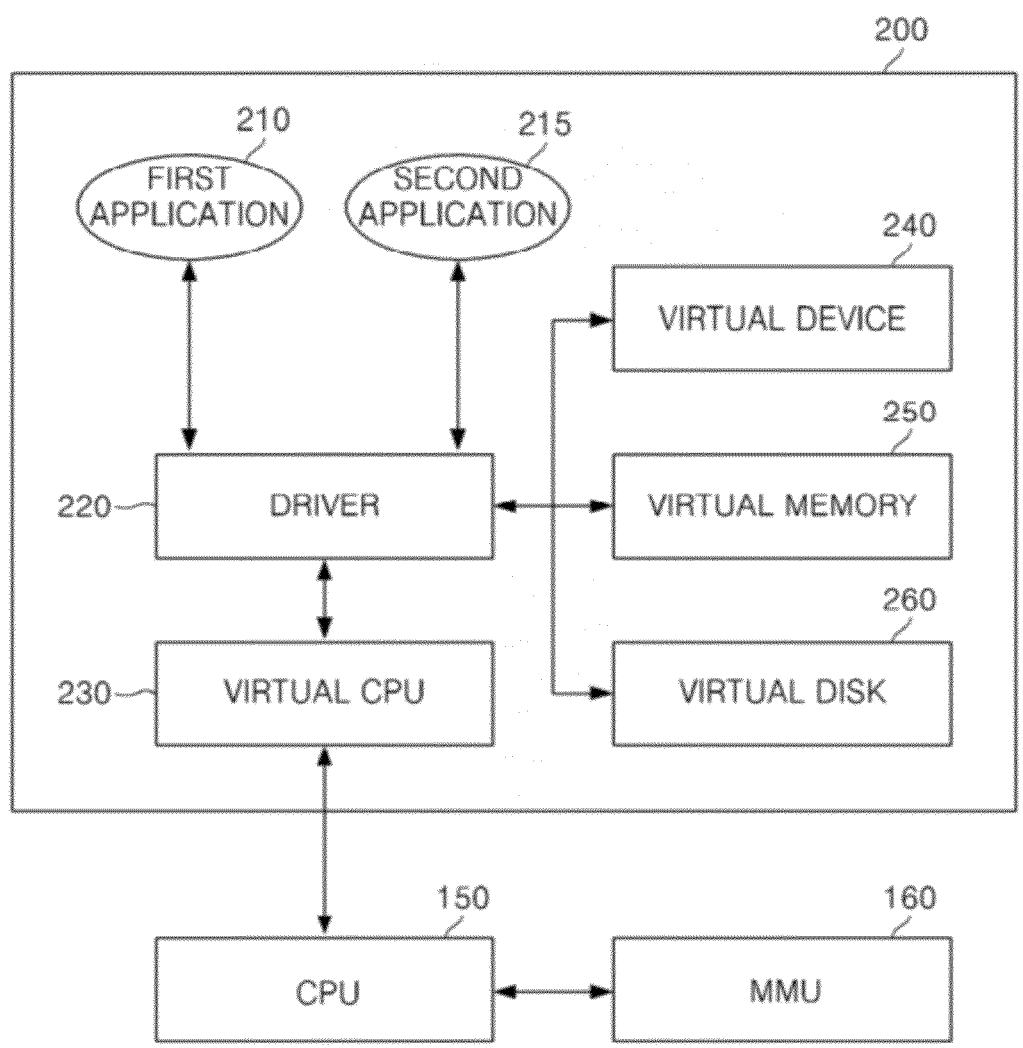
FIG. 3 is a block diagram of a virtual machine according to an exemplary embodiment of the present invention.

FIG. 3 is a block diagram of virtual machine 200 according to an exemplary embodiment of the present invention.

Referring to FIGS. 1 through 3, the computer system 100 may include a memory device 110, a central processing unit (CPU) 150, a memory management unit (MMU) 160, a mass storage device 170, a device 180, and a virtual machine 200.

The computer system 100 may be a system such as a mobile device, a notebook computer, or a desktop computer.

The memory device 110 may include a controller 120, a memory cell unit 130, and a hash unit 140.

The memory device 110 is connected with hosts, i.e., the CPU 150 and the MMU 160 through an interface (not shown) and may include dynamic random access memory (DRAM) and non-volatile memory (NVM). The NVM may be electrically erasable programmable read-only memory (EEPROM), flash memory, magnetic RAM (MRAM), spin-transfer torque MRAM, ferroelectric RAM (FeRAM), phase-change RAM (PRAM), resistive RAM (RRAM), nanotube RRAM, polymer RAM, nano floating gate memory, holographic memory, molecular electronics memory device, insulator resistance change memory, and the like.

The controller 120 controls an overall operation of the memory device 110. When virtual environments are used in the computer system 100, a plurality of virtual machines 200 are able to run respective operating systems (OSs). When virtual environments are used, fault tolerance can be set so that even if a part of a circuit malfunctions, it is automatically corrected so as not to entirely affect the computer system 100; and the workload is uniformly distributed so that overload is substantially prevented from occurring in a particular application. Such virtual environments can be set in the computer system 100, servers, etc.

According to exemplary embodiments described herein, a page is 4 KB and may include a 1024 32-bit data word or 4096 8-bit bytes. It should be noted that the page may have any size, and that embodiments of the present invention are not limited to examples described herein.

The controller 120 controls the hash unit 140. The hash unit 140 determines a hash value using a hash function based on a new page address transmitted from the CPU 150. The controller 120 may also control the memory cell unit 130 to receive addresses of pages having the same hash value from the hash unit 140 and transmit the content of the pages having the same hash value.

The controller 120 may include a comparator 125. The comparator 125 compares in detail the contents of pages having the same hash value. When it is found that the contents of the pages are the same as the comparison result, the controller 120 may register a bit value indicating that the pages have the same contents in the hash unit 140. The bit value will be described with reference to FIG. 5B. When multiple pages having the same content each occupy the memory cell unit 130, the efficiency of the mass storage device 170 as well as the memory cell unit 130 may be decreased in the virtual environments.

Therefore, pages having the same hash values are detected and classified, the contents of the pages are compared with each other in detail, and duplicate pages are removed when the contents of the pages are the same, thereby reducing the amount of memory used and enabling data to be retained and managed at reduced cost. This operation may be referred to as data deduplication.

The CPU 150 may be a multi-processor or a multi-core processor in which a plurality of processor cores are integrated into a single package. The CPU 150 may be involved in the operation of different parts of the computer system 100. According to an exemplary embodiment of the present invention, the CPU 150 transmits a virtual address to the MMU 160 and the MMU 160 receives the virtual address and translates the virtual address into a page address that is a physical address in memory. The CPU 150 may control at least one device 180 and at least one virtual machine 200.

The device 180 may be any peripheral device, such as an input/output device or a storage device, connected to the computer system 100. The virtual machine 200 may be implemented in a virtual environment.

Referring to FIG. 3, the virtual machine 200 may include a first application 210, a second application 215, a driver 220, a virtual CPU 230, a virtual device 240, a virtual memory 250, and a virtual disk 260. The virtual CPU 230, the virtual device 240, and the virtual memory 250 perform the same functions as the CPU 150, device 180, and memory 110 in the computer system 100.

The MMU 160 may translate a virtual address read and written by the CPU 150 into a page address and control the access to the memory device 110 illustrated in FIG. 2. The MMU 160 refers to a page table when translating a virtual address into a page address. The page table stores page information. The page address may be identified based on the page information stored in the page table. The page table has a read/write access permission to each page.

FIG. 4 is a table showing operations performed in the memory device 110 over time according to an exemplary embodiment of the present invention. The present invention is not restricted to embodiments illustrated in FIG. 4.

In operation of the first and second applications 210 and 215, when the virtual address of the first application 210 output from the CPU 150 is a first virtual address VA1, the MMU 160 translates the first virtual address VA1 into a first page address PA1 of a first page. In other words, the first application 210 designates the first page address PA1.

When the virtual address of the second application 215 output from the CPU 150 is a second virtual address VA2, the MMU 160 translates the second virtual address VA2 into a second page address PA2 of a second page. In other words, the second application 215 designates the second page address PA2.

In an exemplary embodiment illustrated in FIG. 4, the first application 210 may request data stored at the first page address PA1 and the second application 215 may request data stored at the second page address PA2. At this time, both read and write operations are possible with respect to the first and second page addresses PA1 and PA2.

Further, the controller 120 compares the content of data at the first page address PA1 with the content of data at the second page address PA2 using the comparator 125. For purposes of an exemplary embodiment, it is assumed that the first page address PA1 and the second page address PA2 have the same hash value. When it is found by the comparator 125 that the content at the first page address PA1 is the same as the content at the second page address PA2, the controller 120 sets the same bit value for the first and second page addresses PA1 and PA2 within the hash unit 140.

An OS run in the CPU 150 may periodically read bit values in the hash unit 140. The CPU 150 recognizes, based on the hash table in the hash unit 140, that a bit value for the first page address PA1 is the same as that for the second page address PA2 and changes the page table so that both the first virtual address VA1 requested by the first application 210 and the second virtual address VA2 requested by the second application 215 are mapped to the first page address PA1. The page table may be stored in the memory device 110. After the CPU 150 changes the page table, the MMU 160 recognizes the change in the page table.

In detail, page information stored in the page table within the memory device 110 may be changed so that pages having the same content have the same page address. In other words, the CPU 150 may change the page addresses of the pages having the same content so that the pages having the same content designate one of the pages using a bit value. The bit value will be described in detail with reference to FIG. 5B.

At this time, the first and second applications 210 and 215 share memory corresponding to the first page address PA1 as read-only memory. In other words, both of the first page and the second page have the first page address PA1. The controller 120 may backup the content of data stored at the first page address PA1.

When new data is written to the second page, the MMU 160 may generate and transmit a page fault to the CPU 150 since the access permission to the second page is read only.

When recognizing the page fault, the CPU 150 may detect whether the original access permission to the second page encompasses a write permission.

When it is detected that the original access permission to the second page encompasses the write permission, sharing of the first page address PA1 may be cancelled using a copy-on-write (COW) mechanism. A new page having a new page address, a third page address PA3 may be allocated for the second page and the content of the first page may be copied to the new page. The address of the second page is set to the third page address PA3. The CPU 150 may reset the first page and the second page to the original access permission.

When it is detected that the original access permission to the second page does not encompass the write permission, the page fault is processed according to the settings of the OS. For example, the second application 215 attempting to write to the second page may be forced into termination.

Figure 5A:
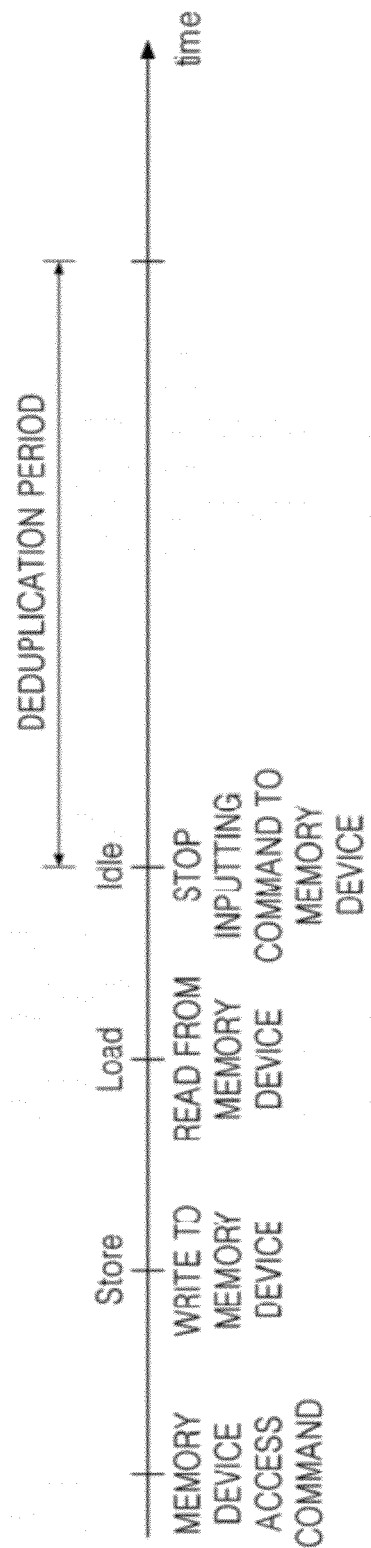
FIG. 5A is a diagram showing an operating method of a memory device in a time domain according to an exemplary embodiment of the present invention.

FIG. 5A is a diagram showing an operating method of the memory device 110 in a time domain according to an exemplary embodiment of the present invention.

Referring to FIG. 5A, when the CPU 150 generates a command to access the memory device 110, i.e., a memory device access command, the memory device 110 may store data in the memory cell unit 130. Based on the data stored in pages, the hash unit 140 determines a hash value for each of the pages and registers pages having the same hash value in a hash bucket. The hash values may be determined using a hash function that may use a cyclic redundancy check (CRC) or a checksum. The CRC and the checksum are used to check errors.

The hash function is a well-defined procedure or mathematical function for the determination of hash values. The operation of the hash unit 140 will be described in detail with reference to FIG. 6.

After reading the data from the memory device 110, the CPU 150 enters an idle state. When there is no command input to the memory device 110 in the idle state of the CPU 150, the controller 120 of the memory device 110 may compare the contents of the pages having the same hash value. The comparison may be performed byte-by-byte.

After the comparison, the page addresses of pages having the same content are changed to a page address of one of the pages having the same content so that the pages have the same page address and share the content.

Figure 5B:
FIG. 5B is a table showing the operating method of the memory device illustrated in FIG. 5A.

FIG. 5B is a table showing an exemplary operating method of the memory device 110 illustrated in FIG. 5A. FIG. 5B shows the changes in bit values in a hash table stored in the hash unit 140 when the content of a page having a page address of 0 is the same as the content of a page having a page address of 5 and the content of a page having a page address of 12 is the same as the content of a page having a page address of 9.

Referring to FIGS. 5B and 6, a table index is associated with a page address and a bit value that indicates a slot into which a current page is classified in a hash table 646. A bucket index corresponding to a hash value is a reference used to identify pages having the same hash value. Referring to FIG. 5B, pages having the same hash value are all classified as bucket index A.

A bit value may be composed of at least one bit. The number of bits in the bit value may be determined depending on the number of slots provided to separately store a plurality of pages by classification in a bucket. In the case of FIG. 5B, four slots are provided for a bucket corresponding to the bucket index A and the bit value has two bits.

The hash unit 140 classifies pages having the same hash value into one bucket. Pages having page addresses of 0, 5, 12, and 9 are classified into the bucket index A in FIG. 5B. Because pages having the same hash value are likely to have the same content, the pages having the same hash are classified into one bucket different than a bucket for pages having a different hash.

The contents of pages having the same hash value are compared to carry out data deduplication. The data deduplication operation illustrated in FIG. 5B is carried out during a deduplication period illustrated in FIG. 5A. In the bucket having the bucket index A, when the content of the page having the page address of 0 is the same as that of the page having the page address of 5, and the content of the page having the page address of 12 is the same as that of the page having the page address of 9, the controller 120 changes the bit values of the pages having the same content to be the same as each other in the hash table.

Thereafter, since pages having the same bit value have the same content, the pages share the content based on the bit values. The deduplication period corresponds to a period during which the CPU 150 is in the idle state. The controller 120 carries out the data deduplication in this period.

FIG. 6 is a block diagram of a computer system 600 according to an exemplary embodiment of the present invention. The computer system 600 may include a memory device 610 and a CPU 650. Although not shown in FIG. 6, the MMU 160 translates a virtual address into a page address as described above.

The memory device 610 may include a controller 620, a memory cell unit 630, a hash unit 640, and a plurality of flags 662, 664, and 666.

The hash unit 640 may include a hash value calculator 642, a hash value comparator 644, a hash table 646, and a hash table pointer 648.

The hash value calculator 642 may determine a hash value using a hash function when data is written to the memory device 610.

The hash value comparator 644 compares the hash value determined by the hash value calculator 642 with existing hash values stored in the hash table 646. When a hash value in the hash table 646 is the same as the determined hash value, the hash table pointer 648 designates a pointer for the data so that the data is classified into a bucket index into which pages having the hash value have been classified. When the determined hash value is a new value, the hash value is stored in the hash table 646.

When a plurality of pages have the same content as one another, the hash table pointer 648 sets the same bit value for the pages having the same content.

The hash table 646 may include a plurality of buckets, each bucket including a plurality of slots. Pages having the same hash value are stored in each of the buckets. The hash table 646 may include information such as a table index, a bucket index based on a hash value, a bit value, and a page address.

The controller 620 may output a first flag signal, a second flag signal, and a third flag signal to the flags 662, 664 and 666 in response to a command from the CPU 650.

Each of the flags 662, 664 and 666 may pass only one signal among a plurality of signals or divide a signal into a plurality of signals, and may be a multiplexer or a demultiplexer in exemplary embodiments, but the present invention is not restricted to exemplary embodiments described herein. In other words, a determination of which signal is to be passed by which flag (e.g., 662, 664 or 666) is determined by the type of a flag signal output from the controller 620.

For example, the controller 620 may control the hash value calculator 642 to determine a hash value by outputting the first flag signal. The controller 620 outputs the first flag signal so that the hash value determined by the hash value calculator 642 is compared with hash values stored in the hash table 646 and is stored in the hash table 646.

The controller 620 may output the first flag signal so that a new page having a page address corresponding to a virtual address transmitted from the CPU 650 is stored in the memory cell unit 630 via flag 662. The controller 620 may output the second flag signal so that bit values in the hash table 646 are changed according to a result of a comparator 625 comparing the contents of pages having the same hash value.

The controller 620 may output the third flag signal so that the page addresses of pages determined to have the same content based on bit values in the hash table 646 are transmitted to the CPU 650 via flag 666. At this time, the CPU 650 may change the page addresses of some of the pages having the same content so that the pages share the content of one of them.

Alternatively, the CPU 650 may change the page address of all pages having the same content except for one of the pages so that the pages share the content of one of the pages. In other words, the controller 620 outputs different flag signals to make pages having the same content have the same page address, thereby preventing the same content from being stored redundantly.

For example, when a flag signal is 00, the hash value calculator 642 and the hash value comparator 644 are activated and the hash table pointer 648 generates a pointer. When the flag signal is 00, generation of the hash table 646 is carried out. At this time, a page address input to the memory cell unit 630 is a page address transmitted from the CPU 650.

When a flag signal is 01, duplicate data is removed. At this time, the hash value calculator 642 and the hash value comparator 644 are deactivated and a page address input to the memory cell unit 630 is a page address stored in the hash table 646. In other words, only pages having page addresses stored in the hash table 646 can be transmitted to the memory cell unit 630.

When a flag signal is 10, bit values in the hash table 646 are made to be read by the CPU 650 for the removal of duplicate data.

The memory cell unit 630 may transmit pages stored therein to buffers 626 and 628 via the flag 664. The number of the buffers 626 and 628 may be greater than or equal to the number of pages that have the same hash values and are transmitted from the memory cell unit 630. The controller 620 transmits the data, e.g., the contents of pages having the same hash value, to the buffers 626 and 628, respectively, and controls the comparator 625 to determine whether the contents of the pages are the same.

When the contents of the pages are the same, the controller 620 sends this information to the hash table pointer 648 so that bit values of the pages in the hash table 646 are changed.

When a new page is input to the memory cell unit 630, the controller 620 may control a new hash value to be determined for the new page. The new hash value may be recorded in the hash table 646.

When there is a page that is not used in the computer system 600, the CPU 650 may transmit information about the non-used page to the controller 620 and the controller 620 may remove a hash value corresponding to the non-used page from the hash table 646. This exemplary operation will be described in detail with reference to FIG. 7.

FIG. 7 is a diagram showing a relation between a hash table and a page according to an exemplary embodiment of the present invention. FIG. 7 shows an example and the number of pages, page addresses, the number of buckets, the number of pages classified into each bucket, and so on are not restricted to this example.

Referring to FIG. 7, eight pages 710 respectively have page addresses 715 respectively having values 1 through 8. As described above, the hash table 646 includes a plurality of buckets. Pages having the same hash values may be classified into and stored in a same bucket.

The pages having page addresses of 1 and 2 are stored in bucket 0. A page having a page address of 6 is stored in bucket 1. A page having a page address of 3 is stored in bucket 2. The pages having page addresses of 4, 5, 7, and 8 are stored in bucket 3.

In other words, the pages having the page addresses of 1 and 2 have the same hash value, and the pages having the page addresses of 4, 5, 7, and 8 have the same hash value.

The comparator 625 compares the contents of the pages in each bucket. Based on a result of the comparison, the controller 620 may change page addresses in the hash table.

FIG. 8 is a flowchart of an operating method of the computer system 600 according to an exemplary embodiment of the present invention. A new page is externally input to the memory device 610 at block S801.

When a first flag signal is input through the controller 620 to the flags 662, 664, and 666 at block S803, the hash value calculator 642 determines a hash value for the new page using a hash function at block S805. The hash table 646 is created based on the determined hash value and the determined hash value is recorded in the hash table 646 at block S807. It is determined whether the CPU 650 is in an idle state at block S809. When the CPU 650 is in the idle state, a second flag signal is input through the controller 620 to the flags 662, 664, and 666 at block S811. In a state where no commands are externally input to the memory device 610, the controller 620 controls page addresses of pages having the same hash value to be transmitted to the memory cell unit 630 at block S813.

The comparator 625 compares the contents of the pages having the same hash value at block S815. When the contents of the pages having the same hash value are the same, the controller 620 changes bit values in the hash table 646 at block S817.

The controller 620 outputs a third flag signal at block S819 to enable the CPU 650 to read bit values from the hash table 646 for the removal of duplicate data. The CPU 650 recognizes pages having the same content based on the bit values in the hash table 646. The CPU 650 changes a hash table 646 so that one of the pages having the same content is designated and the content of the page is shared by the other pages at block S821.

When new data is input to one of the pages sharing the same content, the CPU 650 cancels the sharing of the content at block S823. After cancelling the sharing, the CPU 650 allocates a new page for the page receiving the new data at block S825. The CPU 650 copies the shared content to the new page at block S827 and sets a new page address for the page receiving the new data at block S829.

Since the recognition of duplicate data is carried out in the idle state of the CPU 650, the controller 620 does not output the second flag signal while the CPU 650 is not in the idle state. While the CPU 650 is writing new data to the memory device 610, the memory device 610 may create the hash table 646 and record hash values determined using a hash function in the hash table 646.

As described above, according to exemplary embodiments of the present invention, the removal of duplicate data occurring due to the use of a plurality of virtual machines is carried out by a memory device instead of a CPU, thereby reducing the load and the overhead of the CPU. As a result, the operating speed of an entire computer system may be increased.

While the present invention has been particularly shown and described with reference to exemplary embodiments thereof, it will be understood by those of ordinary skill in the art that various changes in forms and details may be made therein without departing from the spirit and scope of the present invention as defined by the following claims.

What is claimed is:

1. A memory device comprising:
   a hash table storing a hash value, a bit value, and a page address for each of a plurality of pages;
   a memory cell unit configured to store the pages and output contents corresponding to the page addresses of the pages having a same hash value; and
   a controller comprising a comparator configured to compare the contents output from the memory cell unit and change at least one bit value associated with a respective one of the pages upon determining that the contents of the pages are the same.

2. The memory device of claim 1, wherein the controller is configured to determine a new hash value for a new page and record the new hash value for the new page in the hash table upon the memory cell unit receiving the new page.

3. The memory device of claim 1, wherein the controller is configured to transmit the plurality of page addresses to the memory cell unit during an idle state of a central processing unit connected to the memory device.

4. The memory device of claim 1, wherein a same bit value among the bit values of the pages indicates a sharing of the contents and the controller is configured to cancel the sharing of the contents upon new data being input to at least one of the pages having the same bit value.

5. The memory device of claim 4, wherein the controller is configured to change the hash value for each of the pages that receives the new data, wherein the hash value for each page not receiving the new data is not changed.

6. The memory device of claim 1, wherein the controller is configured to output a first flag signal to control a new hash value to be determined and stored in the hash table, the new hash value to be compared with the hash values stored in the hash table, and the controller configured to output a second flag signal to control the at least one bit value to be changed based on a result of the comparator comparing the contents of the pages having the same hash value.

7. A computer system comprising:
   the memory device comprising
      a hash table storing a hash value, a bit value, and a page address for each of a plurality of pages,
      a memory cell unit configured to store the pages and output contents corresponding to the page addresses of the pages having a same hash value, and
      a controller comprising a comparator configured to compare the contents output from the memory cell unit and change at least one bit value associated with a respective one of the pages upon determining that the contents of the pages are the same;
   a central processing unit configured to transmit a virtual address; and
   a memory management unit configured to translate the virtual address received from the central processing unit into a page address.

8. The computer system of claim 7, wherein the central processing unit is configured to change the page addresses of the pages having the same contents so that one of the pages is designated and the contents of a designated page are shared by remaining ones of the pages based on the bit values.

9. The computer system of claim 8, wherein the central processing unit is configured to cancel the sharing of the content when new data is input to one of the pages having the same contents, allocate a new page for the page receiving the new data, copy the shared content to the new page, and set a new page address for the page receiving the new data.

10. The computer system of claim 7, wherein the central processing unit is configured to change the page addresses of all of the pages having the same content except for one of the pages, wherein one of the pages is designated and the contents of a designated page is shared by remaining ones of the pages having the same content based on the bit values.

11. The computer system of claim 7, wherein the central processing unit is configured to transmit information about a page that is not used to the controller, and the controller is configured to remove a hash value corresponding to the page that is not used from the hash table.

12. A method of a memory device comprising:
creating a hash table storing a hash value, a bit value, and a page address for each of a plurality of pages;
determining a plurality of page addresses of the pages having a same hash value;
comparing a content of each of the pages corresponding to the page addresses with one another to determine at least two pages having a same content; and
identifying the at least two pages having the same content with the bit values.

13. The method of claim 12, further comprising:
determining a new hash value based on a new page when the new page is input; and
recording the new hash value in the hash table.

14. The method of claim 12, further comprising transmitting the page addresses of the pages having the same hash value while no commands are externally input to the memory device.

15. The method of claim 12, further comprising transmitting the page addresses of the pages having the same hash value during an idle state of a central processing unit connected to the memory device.

16. The method of claim 12, wherein the hash table is created upon receiving a first flag signal, wherein creating the hash table comprises:
determining the hash values using a hash function;
comparing the determined hash values with an existing hash value stored in the hash table; and
storing the determined hash values in the hash table.

17. A data deduplication method of a memory device comprising:
creating a hash table storing a hash value, a bit value, and a page address for each of a plurality of pages;
determining that a central processing unit connected to the memory device is idle; and
comparing, during an idle time of the central processing unit, a content of each of the pages having a same hash value with one another to determine at least two pages having a same content.

18. The data deduplication method of claim 17, further comprising identifying the at least two pages having the same content with the bit values.

19. The data deduplication method of claim 17, further comprising:
determining a new hash value based on a new page when the new page is input; and
recording the new hash value in the hash table.

20. The data deduplication method of claim 17, wherein the hash table is created upon receiving a first flag signal, wherein creating the hash table comprises:
determining the hash values using a hash function;
comparing the determined hash values with an existing hash value stored in the hash table; and
storing the determined hash values in the hash table.

* * * * *